US012737726B1

(12) United States Patent
Jain et al.

(10) Patent No.: US 12,737,726 B1
(45) Date of Patent: Sep. 15, 2026

(54) SYSTEM AND METHOD FOR IMPROVING BOTS USING INTELLIGENT ARTIFICIAL INTELLIGENCE DATA EXTRACTION

(71) Applicant: Morgan Stanley Services Group Inc., New York, NY (US)

(72) Inventors: Anju Jain, Briarcliff Manor, NY (US); Guy Tufau, Jr., New York, NY (US); Michel Tremblay, La Prairie (CA); Supriya Karmankar, Maharashtra (IN); Sahil Singh Rawat, Madhya Pradesh (IN); Hardee Chetan Khambhla, Mumbai (IN); Divya Goyal, Surat (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/392,615

(22) Filed: Nov. 18, 2025

(51) Int. Cl.
*G06Q 30/00* (2023.01)
*G06Q 10/10* (2023.01)

(52) U.S. Cl.
CPC .................................. *G06Q 10/103* (2013.01)

(58) Field of Classification Search
None
See application file for complete search history.

(56) References Cited

U.S. PATENT DOCUMENTS 11,551,143 B2 1/2023 Ganti et al.
11,849,069 B1 12/2023 Can
11,869,506 B2 1/2024 Fink et al.
11,960,841 B2 4/2024 Devendran et al.
12,148,421 B2 11/2024 Baeuml et al.
2011/0153322 A1* 6/2011 Kwak ..................... G10L 15/22 704/235
2020/0082214 A1* 3/2020 Salammagari ......... G06N 3/006
2020/0125678 A1 4/2020 Conley et al.
2021/0295203 A1* 9/2021 Liao ........................ G06F 40/35
(Continued)

OTHER PUBLICATIONS

M. J. Dileep Kumar, M. Sukesh Rao and K. C. Narendra, "Multimodal Emotion Recognition: A Comprehensive Survey of Datasets, Methods, and Applications," in IEEE Access, vol. 13, pp. 201067-201097, 2025 (Year: 2025).*
(Continued)

*Primary Examiner* — Matthew T Sittner
(74) *Attorney, Agent, or Firm* — PEARL COHEN ZEDEK LATZER BARATZ LLP

(57) ABSTRACT

A system and method may improve AI systems such as bots or chatbots by, for each of a plurality of chatbot transcripts, creating a summary using an LLM (large language model) to create a set of summaries; based on the set of summaries, creating a set of standardized intents, each standardized intent associated with a set of chatbot transcripts determined to be similar; for each standardized intent, generating a set of utterances provided by a user to a chatbot associated with the transcripts associated with the standardized intent; for each chatbot transcript, creating, using an LLM, a resolution summarizing the manner the intent was solved; and for each standardized intent performing one or more of: creating a project management ticket comprising a standardized intent and a set of associated resolutions and a set of associated utterances; and training a chatbot using utterances.

14 Claims, 5 Drawing Sheets

(56) References Cited

U.S. PATENT DOCUMENTS

| | | | |
|---|---|---|---|
| 2022/0108164 | A1 | 4/2022 | Coman et al. |
| 2023/0024204 | A1* | 1/2023 | Bingham ................ H04L 51/10 |
| 2023/0237276 | A1 | 7/2023 | Lima |
| 2023/0274092 | A1 | 8/2023 | Sastre Martinez et al. |
| 2023/0297778 | A1 | 9/2023 | Can et al. |
| 2023/0298615 | A1 | 9/2023 | Can et al. |
| 2023/0403357 | A1* | 12/2023 | Ezell ....................... G10L 15/26 |
| 2024/0211690 | A1 | 6/2024 | Faizakof et al. |
| 2024/0256622 | A1* | 8/2024 | Abrams .............. G06F 16/9538 |
| 2024/0281457 | A1 | 8/2024 | de Witte et al. |
| 2024/0281706 | A1 | 8/2024 | Marzinzik et al. |
| 2024/0395246 | A1* | 11/2024 | Mcquinn ................. G10L 13/02 |
| 2024/0414017 | A1 | 12/2024 | Lee et al. |
| 2024/0428003 | A1 | 12/2024 | Kakodkar et al. |
| 2025/0087208 | A1* | 3/2025 | Lee ..................... G10L 15/1822 |
| 2025/0200098 | A1* | 6/2025 | Halyal .................... G06F 40/30 |
| 2025/0200489 | A1* | 6/2025 | Ghoche ................... G06F 40/35 |
| 2025/0240351 | A1* | 7/2025 | Ostrand .................. G06F 40/35 |
| 2025/0355918 | A1* | 11/2025 | Reddy ................... G06F 16/345 |
| 2025/0390544 | A1* | 12/2025 | Zhou ..................... G06F 16/345 |

OTHER PUBLICATIONS

A. Mullick, S. Purkayastha, S. Sharma, P. Goyal and N. Ganguly, “IDALC: A Semisupervised Framework for Intent Detection and Active Learning Based Correction,” in IEEE Transactions on Artificial Intelligence, vol. 7, No. 5, pp. 2739-2750, May 2026 (Year: 2026).*

* cited by examiner

SYSTEM AND METHOD FOR IMPROVING BOTS USING INTELLIGENT ARTIFICIAL INTELLIGENCE DATA EXTRACTION

FIELD OF THE INVENTION

The present invention relates generally to the development and improvement to automated processes such as chat bots; and to analysis of and automatic improvement of the behavior of such processes.

BACKGROUND OF THE INVENTION

Organizations may use automated processes such as bots or chatbots, for example in the context of a help desk, where a chat bot may interact with people such as employees, to help the people diagnose and solve problems such as software, computer hardware, and information technology (IT) problems.

Such chatbots may be improved by development teams reading transcripts of chatbot sessions, and from these creating tasks to improve the chatbots such as automation work card requests in a Jira system.

Helpdesk chatbots such as IT chatbots may struggle with automated resolution rates due to unmapped "intents" and a slow, manual process for updates to their knowledge banks. This is a problem for analysts who develop and improve such chatbots as they may spend significant time reviewing transcripts to identify issues and resolutions. This is also a problem for development teams who subsequently gather utterances to train models and build workflows to automate the process. These manual processes are time-consuming and iterative, hindering scalability which could lead to low resolution rates and high manual efforts. Automating this process would expand chatbot capabilities, improve resolution rates, and reduce the burden on human agents.

SUMMARY

A system and method may improve AI systems such as bots or chatbots by, for each of a plurality of chatbot transcripts, creating a summary using an LLM (large language model) to create a set of summaries; based on the set of summaries, creating a set of standardized intents, each standardized intent associated with a set of chatbot transcripts determined to be similar; for each standardized intent, generating a set of utterances provided by a user to a chatbot associated with the transcripts associated with the standardized intent; for each chatbot transcript, creating, using an LLM, a resolution summarizing the manner the intent was solved; and for each standardized intent performing one or more of: creating a project management ticket comprising a standardized intent and a set of associated resolutions and a set of associated utterances; and training a chatbot using utterances.

Embodiments of the present invention may improve AI, bot or chatbot technology, by improving bot development, improving data used in bot refinement, improving bots themselves, and improving the operations of computer systems operating and training or improving such systems. Embodiments may increase bot ticket resolution rates, and provide enhanced chatbot automation and training for improved accuracy. Embodiments may automate transcript analysis and find utterances for intent training to expand chatbot capabilities, improve resolution rates, and reduce the burden on human agents. Embodiments may use intelligent AI data extraction to extract and develop data from bot transcripts, then use that data to improve the bot.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
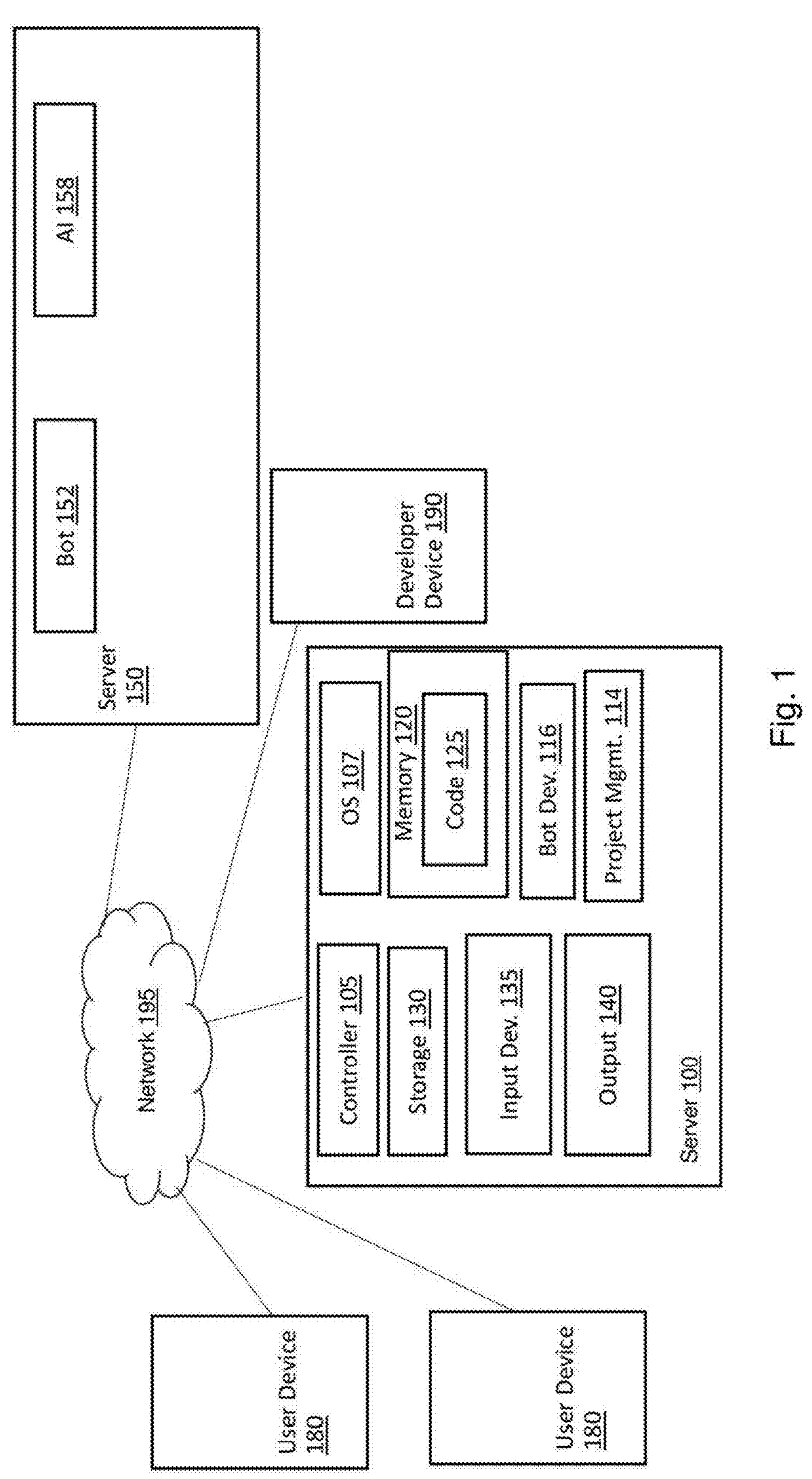
FIG. 1 depicts an example system according to some embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

FIG. 1 depicts an example system according to some embodiments of the present invention. Referring to FIG. 1, users may operate user devices 180 to access a bot 152 (e.g. a chatbot), for example to answer IT or tech support questions. Bot 152 may be executed by or at a computer system such as a server 150, which may be part of a cloud system or a server hosted by an organization. Although server 150 is shown executing bot 152, bot 152 may be executed by another sort of computer. Bot 152 may engage in text or spoken conversations with users, using AI such as generative AI, to engage in conversations with users in natural language.

A project management system 114, e.g. a Jira system by Atlassian, may allow software improvement, issue or bug tracking, and agile project management. Such a system may track and record project, requirements, task, bug, change, code, test, release, and sprint management. While the Jira system is used as an example, other project management systems may be used. A project management "ticket", issue or task may be created, describing, in the project management system, a task for resolution, using the particular data format of the project management system. The ticket (e.g. created by an embodiment of the invention) may include data such as a unique identifier (e.g. ticket ID), name, additional attached data (e.g. files, images, screenshots, links, child issues or tickets, related issues or tickets, etc.), details about the ticket, such as a description, status, assignee, labels, reporter, etc. Such a project management ticket is distinguished from a bot ticket discussed elsewhere herein: project management tickets may be created from input bot tickets.

A bot development system 116 may be used by a developer to improve or develop bots, may analyze data and create project management system tickets or tasks (e.g. create or extract intents, utterances, summaries, etc.), may automatically develop or train bots, or perform other functions. Bot development system 116 may use or access one or more LLMs or AIs 158 to for example create or extract intents, utterances, summaries, etc. or perform other functions. Bot development system 116 may be for example Python or other code performing a series of operations, such as creating intent, utterances, etc., interfacing with and providing input to AI, and updating a bot or creating a project management ticket. While units such as bot 152, project management system 114, bot development system 116, and AI 158 are shown as being executed by server 100, this is a non-limiting example, and such modules or systems may be executed in other units, such as by developer device 190, in a remote cloud system, in server 150, etc.

A server 100 may in conjunction with other systems shown such as developer device 190, improve or train a chatbot or bot, extract or create data from bot transcripts, and create project management tickets, etc., as described elsewhere herein. In some embodiments, server 100 may be the same server as server 150, and while certain functionality is shown being performed by certain devices, in other embodiments, other devices may perform such functionality. A developer using a developer device 190 may improve or develop bots, for example by accessing project management system 114 tickets, controlling or initiating a bot improvement process, and altering or developing a bot, such as by causing a bot or its AI to be trained or retrained, linking data such as utterances to data such as solutions, etc. Training a bot or chatbot (e.g. automatically, or by a developer) using output from methods as disclosed herein may include training or altering generative AI used by the chatbot.

Devices 100, 150 and 180 may be connected by one or more networks 195, such as a f2telephone system (e.g. POTS), the internet, or an intranet.

A set of example components such as a processor, memory, etc. are shown in server 100, and other devices 150 and 180 may include similar components as shown in server 100, but may include other components. Server 100 may include components such as a controller 105 that may be, for example, a central processing unit processor (CPU), graphics processing unit (GPU) or any other suitable multi-purpose or specific processors or controllers, a chip or any suitable computing or computational device, an operating system 107, a memory 120, executable code 125, a storage system 130, input devices 135 and output devices 140. Controller 105 (or one or more controllers or processors, possibly across multiple units or devices) may be configured to carry out methods described herein, and/or to execute or act as modules, such as bots, chatbots, AI, LLM or GPT models, scripts, project management systems, etc. described herein, for example when executing code 125, and/or processes creating or generating intents, utterances, summaries, project management tickets, etc. One or more devices such as server 100, server 150 developer device 190 and or user device 180 may carry out functions such as those described in FIGS. 2-5.

Operating system 107 may be or may include any code segment to coordinate, schedule, or otherwise manage operation of computing device 100, for example, scheduling execution of software programs or enabling modules to communicate. Memory 120 may be or may include, for example, a Random Access Memory (RAM), a read only memory (ROM), a Dynamic RAM (DRAM), a Flash memory, a volatile or non-volatile memory, a cache memory, or other suitable memory or storage units. Memory 120 may be or may include a plurality of, possibly different, memory units. Memory 120 may be a computer or processor non-transitory readable medium, or a computer non-transitory storage medium, e.g., a RAM. Executable code 125 may be any executable code, e.g., an application, a program, a process or script. Executable code 125 may be executed by controller 105 possibly under control of operating system 107. One or more executable code segments 125 may configure controller 105 to perform methods disclosed herein, and one or more executable code segments 125 may be loaded into memory 120 and cause controller 105, when executing code 125, to carry out methods described herein.

Storage system 130 may be or may include, for example, a hard disk drive, a CD-Recordable (CD-R) drive, a universal serial bus (USB) device or other suitable removable and/or fixed storage unit. Data used with methods described herein may be stored in storage system 130 and may be loaded from storage 130 into memory 120.

Input device(s) 135 may be or may include a mouse, a keyboard, a microphone, a touch screen or pad or any suitable input device. Output device(s) 140 may include one or more displays or monitors, speakers and/or any other suitable output devices. Any suitable number of input or output devices may be used. For example, a wired or wireless network interface card (NIC), a printer, or a universal serial bus (USB) device may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While specific elements and modules of FIG. 1 are shown as an example hosted by specific computers, in other embodiments, such elements may be hosted by other computers, in cloud based systems, etc.

An embodiment may input transcripts (e.g. textual information) of chats or discussions between human users and automated processes such as chatbots, for example regarding help provided by a chatbot, such as IT help. A process may input a large number of such transcripts, stored for example in a database or NFS (network file storage), and perform data preparation, filtering and/or summarization on the transcripts. Intermediate data produced may be stored in an NFS or a database. Transcript and other data related to a bot interaction or ticket may be stored in for example a ServiceNow system. Each bot ticket or interaction may have a bot or transcript ticket number. As the process proceeds, data such as extracted intents, or utterances, may be associated with each individual interaction or bot ticket, for example by being associated with the bot or transcript ticket number.

A process may receive a date range of transcripts or bot tickets to process from a user. For example, a manager or analyst may select a date range and click a submit button, which may trigger for example a Python backend script which may be part of bot development system 116, and which may function as an end-to-end solution performing functions described herein. Data cleansing may be performed such that transcripts corresponding to support tickets in a specific date range which are manually resolved (e.g. resolved by a person) are filtered and selected for future processing/steps. Tickets or transcripts where no human or live agent is involved are typically not analyzed, since these tickets typically show a successful bot resolution. Rather, Jira tickets or bot updates may be created from data from tickets where a bot started the process, but a human interacted with the user to provide the resolution, as the bot did not satisfactorily provide a resolution. Non-manually resolved transcripts/tickets may be filtered out and removed, since typically transcripts where a chatbot failed to automatically resolve an issue such that the resolution process was transferred to a human for manual resolution, replacing the chatbot, involve issues for which the chatbot needs updating. Data cleansing may include discarding tickets with no or incomplete resolutions.

Bot development system 116 may improve a bot such as a chatbot by for example creating a project management (e.g. Jira system) ticket including a standardized intent and a set of associated resolutions and a set of associated utterances; and/or training a chatbot using utterances. Other or additional data such as transcripts, intents, etc. may be used to create a ticket or train a bot. One or more LLMs may be used to extract or create information from chatbot transcripts, which include conversations between human users and automated processes. In one embodiment, the same LLM or AI (e.g., a generative AI or GPT tool such as that using an OpenAI Completions API) is used to perform functions such as creating or extracting summaries and intents, standardizing intents, generating or extracting utterances, generating or extracting resolutions, etc. For example, the same GPT-4-Turbo AI may be used for the various AI functions discussed. In some embodiments the AI used in the bot (e.g. in use with users) may differ from the AI used in the inventive process for bot development. Typically, each call to an AI is new, e.g. it lacks the context of previous calls in the process. However, in other embodiments, a different LLM or AI may be used for different operations.

A process may extract or determine from the filtered transcripts relevant transcript summaries. For example, bot development system 116 may, for each of a group of chatbot transcripts selected or filtered, create or extract a summary using an AI such as an LLM. Each summary may correspond to a bot ticket. In a summary generation or extraction process, ticket details may be extracted or generated from a transcript (such as problem statement and solution or resolution) which may later in the process be used by the model for further processing. Using summaries and/or transcripts, one or more data items such as intents and utterances may be extracted or created from each transcript. A transcript summary in one embodiment may be information including a set of categories or fields (possibly labelled) describing the transcript according to the categories; typically the entire length of the summary is much less than that of the original transcript. A summary may describe, in text form, what was said or written by each participant, or in total (without regard to participant) in the transcript, possibly in a format organized by data category such as participant names, problem faced, solutions tried, etc. An example summary is provided in the summary production prompt in Table 1 below; other summaries, with different specific categories or labelled fields may be used.

Data such as transcripts, summaries, and extracted intents may be tied to or indexed to its source ticket. Transcript summarizations may be stored, for example in a relational format in data store, for example in an NFS path, a database, etc.

The different operations (e.g. transcript summarization, utterance creation, etc.) may be created using an LLM, generative AI or GPT tool such as using OpenAI Completions API with engineered prompts. A set of prompt strategies may be used. For example, a Chain Of Thought Prompting strategy may be used. Chain Of Thought Prompting evolved from zero shot, through one shot, through multiple shot prompting. A chain of thought prompt may be used with role and output specification, e.g. details of a summary consumer role (e.g., an Analyst), output format (e.g., category/subcategory/outcome/metric etc., word limit expected, etc.) Chain Of Thought Prompting may be useful for operations such as summarization of transcripts. The prompts or inputs to an AI or LLM to create the various components such as summary, utterances, solution, etc., may be hard-coded into a script or algorithm, such as a Python script, but in other embodiments may be configurable. While the prompts typically do not change from execution to execution, the effects of the prompts change based on the dataset. Other prompt techniques may be used.

Table 1 below shows an example prompt or input to an AI or LLM for producing a transcript summary; other prompts may be used. In the example prompt below, the text after "Refer below format for reference" is a sample or example summary; other formats may be used. The summary may be a structured summary with defined fields such as Requester name, Problem faced Category, etc. The sample prompt below generates a summary from one bot transcript or ticket, and the summary may be tied to the ticket by having the ticket number as a component of the summary:

TABLE 1

Summarize the following transcript. Consider the following points while summarizing:
Provide the summary with the following things categorized:
Requester name,
Agent name(if any),
Ticket number(if any),
Problem faced Category (like Outlook, teams, etc). Try not drill down to the specific issue, for example do not use Microsoft Office, use application specific name like Outlook or Teams.
Problem faces sub-category (like what problem inside the category - if applicable),
Solutions Tried/Proposed - Keep this in paragraph format if multiple solutions are tried, list them in bullet points. Keep the word limit to 100 words. DO NOT miss any crucial information that can help in future reference.
Utterances - This should contain a single question asked by the user (not bot or agent) in the chat transcript that can be treated as a prompt for the model for similar query next time. This utterance should CONTAIN the problem category and sub-category clearly if applicable. Keep it to 50 words.
Chat Ratings - Treat the response after question: 'How satisfied were you with the support experience?<br/><i>Note: Please click the up arrow after selecting your option' as the chat ratings for example happy, neutral, etc. If the conversation was closed return Not provided.
Additional Comments - Treat none etc as Not provided
Conversation Outcome: (Resolved | Not Resolved)
Metric: Calculate and provide the Metric in percentage (BLEU - Bilingiual Evaluation Under study score, TER - Translation Edit Rate, METEOR - Metric for Evaluation of Translation with Explicit Ordering) used to transform the transcript to columns Problem faced Category, Problem faces sub-category, Solutions Tried/Proposed and Utterances.
For Chat Ratings:
Treat 'Not provided (The conversation was closed without collecting feedback)' as Not provided
Treat 'Not Provided' as Not provided
DO NOT use " or ' in the beginning/end of the sentences.
SKIP punctuation marks at the end of the sentences.
Refer below format for reference:
Requester Name: John Doe
Agent Name: Virtual Agent
Ticket Number: INC62876354
Problem Faced Category: Teams
Problem Faced Sub-Category: Small font size on User Interface elements like title bar and chat list.
Solutions Tried/Proposed: The agent initially misunderstood the issue but eventually ran a script to fix general Teams issues which inadvertently resolved the font size issue.
Utterances: How can I fix the small font size on Teams?
*Chat Ratings:** Happy
Additional Comments: John remarked it was a great experience that no human was involved during the fix.
Conversation Outcome: Resolved
Metric: BLEU - 80%, TER - 70%, METEOR - 90%
All
####################################
Note:
ameliap (Additional Comments): coresponds to the start of the transcript where the user asked the question
Skype/Teams or Outlook Transcripts corresponds to the later transcript where the chat shifted after initial conversation
Summarize conversation from both these sections.
Transcript: [CODE INSERTS TRANSCRIPT TO BE SUMMARIZED HERE]

Components of a summary may include items such as natural utterances. An utterance may be a phrase or sentence a user uses to describe a problem, or a question asked by a user. An utterance may be a phrase suitable as a prompt to ask a bot to solve a similar problem. For example an utterance may be a phrase, e.g. 50 words or less, including a single question asked by a user that can be treated as a prompt for a bot to use for a similar user query in the future. An utterance may contain elements such as a problem category and sub-category.

The set of summaries may be input to a process to create buckets or intents, which may be created or extracted from summaries. A process may create a set of standardized intents or buckets, each standardized intent or bucket associated with a set of chatbot transcripts determined to be similar. For example, from each transcript summarization, an intent may be generated or refined, e.g. using an LLM, generative AI or GPT tool, such as the OpenAI Completions API with engineered prompts. An intent may be a brief (e.g. approximately 10 words or less) description of the problem about which the user started the bot ticket, or interacted with the bot, for example in the form of the domain of the problem (e.g. the name or type of application or equipment) and the issue or problem, stated often without the use of "problem" or synonyms. An intent may be taken or derived from category/sub-category combinations which are in one embodiment components of a summary. Thus, for example, a category/sub-category "Outlook: Outlook keeps crashing"

may be converted to an intent of "Outlook: closes." Intents may be for example "Application Freezing", "Monitor Font Too Small", or "Cannot Log In To Video Call". Example intents are provided in the example prompt to bucket intents shown in Table 2. A least-to-most prompting technique may be used to generate intents. This technique may instruct the LLM about what is important to identify as an intent and rules instructions on classifying similar intents together. Other prompt techniques may be used. The set of intents resulting from an intent extraction process may be processed to combine or group similar or "matched" intents to produce a smaller (than the original resulting set of intents) set of standard intents for the relevant summaries. The resulting smaller unique set of standard intents, e.g. matched intents, may be bundled for example using Python libraries as a baseline for next steps. Each bundled or standardized intent may be tied to or indexed to its source ticket or transcript.

Figure 2:
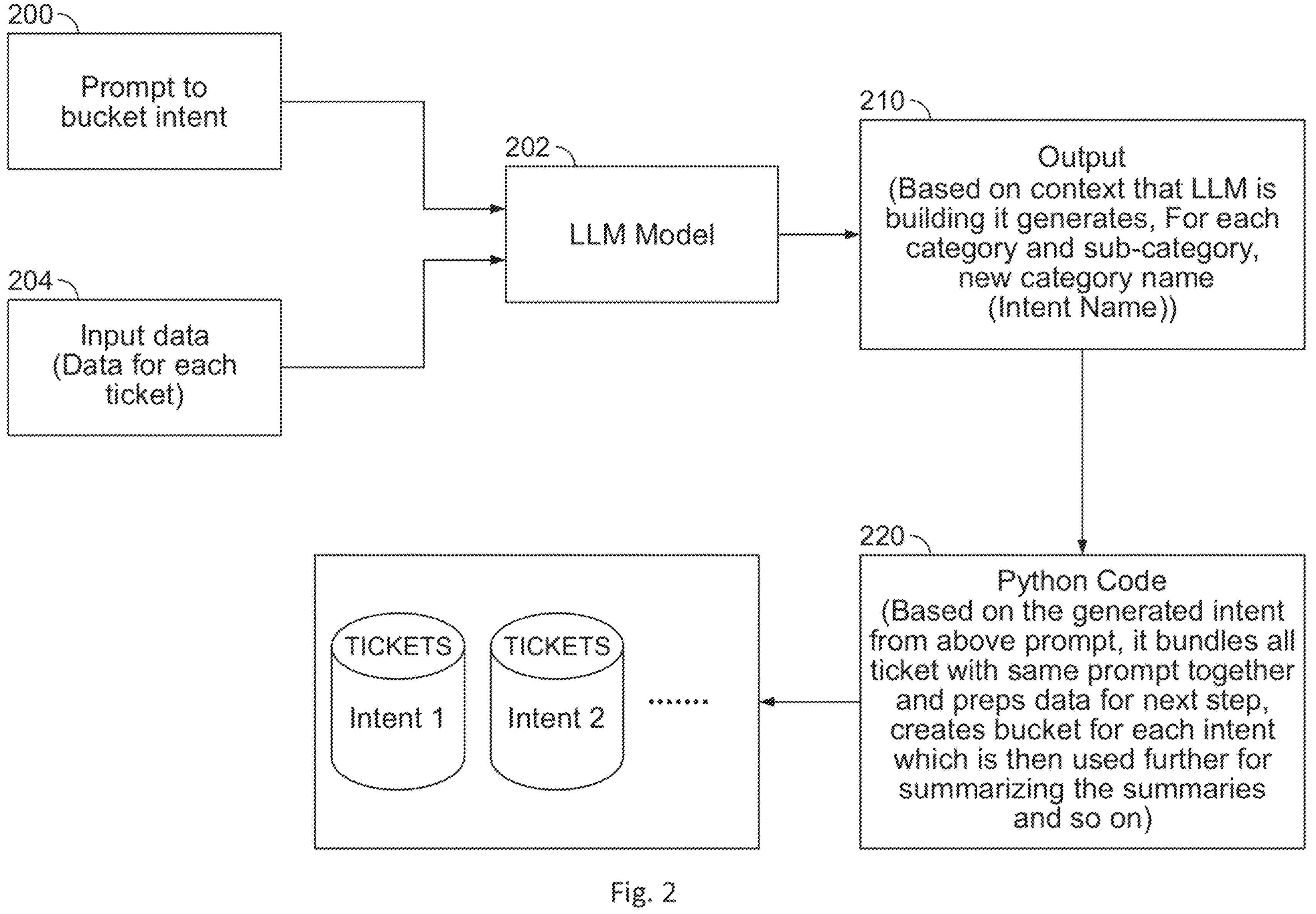
FIG. 2 depicts a sample process for creating and/or bucketing intents according to an embodiment of the present invention.

FIG. 2 depicts a sample process for creating and/or bucketing intents according to an embodiment of the present invention. A prompt to an AI or LLM may be used to bucket intents, or to assign an intent extracted from a transcript to a standardized intent. In the process of FIG. 2, and the prompt to an AI depicted in Table 2, standardized intents, or the title intents of buckets, may be created as the example process iteratively inputs tickets and/or summaries of tickets. The example process shown may input multiple tickets or transcripts (possibly inputting the summaries corresponding to those transcripts instead of the transcripts) and may assign multiple tickets to each among a set of standardized intents. One embodiment may not input all tickets (input may be for example, summaries associated with tickets, and transcripts) from a period of time (e.g. corresponding to all relevant tickets from a certain period, such as a day) at once, but may rather input a subset of tickets at once, and use multithreading and chunks, in an iterative process, allowing the process to work on intermediate data.

Referring to FIG. 2, in operation 200 a prompt may be input into an AI or LLM 202 to bucket intents (e.g. as shown in the example of Table 2), along with data 204 of extracted intents. In operation 210, the AI or LLM may generate a new standard intent or category name representing a number of similar or identical intents extracted from multiple different transcripts or tickets. In operation 220 each generated standard intent may be associated, e.g. in a bucket, with all bot transcripts or tickets having the intent identical to or similar to the standard intent. This may be performed for example via code such as Python code. For example, Python code may use an AI or LLM to read ticket summaries, identify intent for each ticket, and try to align this to an existing intent to bucket similar tickets together. Bot tickets may be referred to, identified, or keyed to using an identifier such as bot interaction ID.

An example prompt or input to an AI or LLM to bucket and/or generate intents is shown below in Table 2; other prompts may be used. A process as in Table 2 may, via a prompt to an LLM, group intents, by inputting a Category and Subcategory for each bot transcript or ticket, generate a standardized intent or bucket in such a way that maximizes "collisions", e.g. tries to ensure the most tickets are in each intent bucket, or are assigned to the same standard intent. Tickets or transcripts which are determined to be similar may be those where the category/subcategory, which is used as source data for intent, are similar, or which produce the same standard intent. The output of an LLM after accepting the prompt may be input to Python or other code to merge the intents based on category and subcategory (e.g. max collision occurred). In the example prompt below, an Intent Name may have two components, a Main Intent and a Description. An example standardized Intent Name or bucket name that may be associated with multiple different tickets may be (as in the prompt below), "Hardware: Display"; an example input non-standard intent from a ticket summary which may be assigned to this bucket may be "Hardware: Monitor issue"

TABLE 2

| |
|---|
| Read the following arrays of category and sub-category and set of intent_set provided below.<br>For each category and sub-category, generate a new category name (Intent Name) based on the given category and sub-category and append it to the output list.<br>The Intent Name can be denoted as: Main Intent: Description<br>For example: Adobe Acrobat Pro, Outlook: Mobile, Outlook: Launch Application<br>Also, for each output also calculate the Metric in percentage which should include<br>BLEU - Bilingual Evaluation Under study score,<br>TER - Translation Edit Rate,<br>METEOR - Metric for Evaluation of Translation with Explicit Ordering<br>used to transform the category and sub-category to Intent Name.<br>While creating the new category names, ensure the following points are taken care of:<br>If the proposed Intent Name is similar or has any synonym to any of the values present in the intent_set, use the existing intent value for that category<br>We want to have minimal unique new Intent Name generated i.e. len(output Intent Name array) == len(category array) but len(set(output Intent Name array)) should be minimal<br>MAKE SURE that len(output Intent Name array) == len(output Metric array) == len(category array)<br>GROUP generated new Intent Name based on their similarity.<br>In the 'Main Intent: Description' if the Description for same Main Intent matches any value in the intent_set use existing intent for that category<br>Use \| as the delimiter in the output array<br>Remove synonyms of malfunction, issues, problem, etc from Description of Processed Intent<br>Include plural and singular in singular DESCRIPTION ONLY<br>FOR EXAMPLE,<br>all things related to hardware can be categorized under a new intent name - 'Hardware' with the short detail in description like Monitor, Printer, headset etc.<br>terms like Monitor, Desktop, Display etc are all synonyms hence can be considered as same description say Display<br>Example Processed Intent -> Expected Processed Intent<br>Hardware: Monitor issue, Hardware: Monitor wont turn on, Hardware: Desktop, Hardware: Monitors not working, Monitor: Display -> Hardware: Display |

TABLE 2-continued

| |
|---|
| Hardware: Mouse, Hardware: Mouse Issue, Hardware: Mouse problem, Hardware: Mouse malfunction -> Hardware: Mouse |
| Hardware: Headset sound issue, Headsets: Not working, Headset: Functionality, Hardware: Jabra -> Hardware: Headset |
| Outlook: Unable to open, Outlook: Unable to launch/connect -> Outlook: Application launch |
| Outlook: Inbox Manager, Outlook: Inbox Update -> Outlook: Inbox |
| Applications: Access, Applications: Access Issue -> Applications: Access |
| THIS IS A MUST THAT len(Metric) == len(Category) AND len(Processed Intent) == len(Category) ABD BELOW FORMAT IS FOLLOWED |
| WAIT for the response until you meet this condition. |
| MAKE SURE that the output should be two lists and no other text/symbol/characters are there apart from what is expected. For example: |
| Input: |
| Category: ["Outlook", "Hardware", "Outlook", "Teams] |
| Sub-Category: ["Error on running application", "Monitor not working", "Application not opening", "Font size issue"] |
| intent_set: ["Outlook: Application launch", "Hardware: Monitor"] |
| Expected Output: |
| **Processed Intent:** [Outlook: Application launch ǀ Hardware: Monitor ǀ Outlook: Application launch ǀ Teams: Font size] |
| **Metric:** [BLEU - 30%, TER - 25%, METEOR - 75% ǀ BLEU - 80%, TER - 50%, METEOR - 90% ǀ BLEU - 42%, TER - 25%, METEOR - 98% ǀ BLEU - 54%, TER - 24%, METEOR - 68%] |
| Treat the following as the input: [CODE PLACES ACTUAL INPUT HERE] |

Typically intent is set blank or empty to start; e.g., the initial input includes an empty intent_set. The Metric produced in response to the prompt above may request that the AI choose a metric producing a certain accuracy of output; for example, an accuracy of at least 80% may be asked for. The output of such a prompt may include concise intent and contextual baseline, for example a table of multiple rows where each row includes data such as ticket number, date created, solutions tried/proposed (e.g. ""—User initially requested escalation for the headphone issue.—Anjali instructed the User on how to report hardware issues via a chatbot for direct escalation.—User attempted the method suggested.—Anjali escalated the ticket on her end as well""), utterances (e.g. "My headphone is not working"), conversation outcome (e.g. not resolved or resolved), short description (e.g. "WS: headset-malfunction"), U-service_desk_defined_ci (e.g." WS: headset"); processed intent (e.g. "Hardware: headset"); intent occurrence (which may be the number of times this intent occurred in tickets resulting in a unique bucket, e.g. "69"); solutions summary (e.g. "For problems related to headsets, several common resolution steps are repeatedly followed. Initially, issues are assessed using basic troubleshooting by virtual agents, which involves confirming if the headset is powered and checking sound settings on the PC to ensure the audio devices are correctly enabled. These steps are crucial before any escalation. If these preliminary checks done resolve the issue, the matter is usually escalated to a live agent, who may conduct a more in-depth technical assessment. In cases where the problem persists, common resolution strategies include verifying the physical condition . . . etc."); metric (e.g. "BLEU-72% ǀTER-25% ǀMETEOR-60%").

For each bot ticket or transcript, a bot development system or process may create or generate, using an LLM, a summary of the solution, or resolution, summarizing the manner the intent or problem for the ticket or transcript was solved. Typically, the interactions of interest are those started with a chatbot, and ended with a human: thus the issue is typically expressed to a chatbot; the utterances used may be those provided to a chatbot and/or human; and the solution or resolution is typically provided by a human agent. Typically, tickets or transcripts input to an embodiment of the invention are labelled or flagged in advance (e.g. by a human, such as the agent who resolved the problem, or by an automated process) as either being resolved by a human (e.g. chatbot switched to human) or a chatbot. For example, for each ticket, when the summary is created, a resolution is generated or summarized as part of that summary. In the prompt example above which creates the summary, in Table 1, this resolution may be "Solutions Tried/Proposed". A resolution may be a summary of how the problem, e.g. expressed in the intent, was solved, which may appear in the text of the transcript as text output to the user querying the chatbot. At a later stage, these multiple resolutions or solutions may be combined or grouped, e.g. by an AI or LLM, to a summary resolution or solution which applies to a group of tickets joined by a common standard intent. The summary or resolution may be text describing to a user how to solve a problem, e.g. instructions, and may be used by a future chatbot to provide text to a user to allow the user to solve a problem.

Resolutions may be summarized or generated using an LLM, generative AI or GPT tool such as using OpenAI Completions API with engineered prompts. A prompting strategy used to generate resolutions may be a context-based prompting technique. This technique provides expected input and context, and a query to execute and expected output format instructions (e.g. no pronouns/word limit) to an LLM.

If an intent identified is "Application freezing", and two tickets with this same intent are identified, a solution summary of each ticket may be eventually attached and highlighted to a Jira process, as an update task to improve a chatbot. In this example, since there are two solution summaries (one per ticket), the Jira body may include a summary of resolution summaries. Different summaries are needed, as different solutions may work for different users for similar issues, and the development team may develop an automation in chatbot around all possible solutions. Solutions or resolutions that are generated may be refined and combined from different transcripts: for example a combined solution may be created by an AI and all tickets linked by a standard summary may be linked to that combined solution. While an example ordering is presented with operations such as resolution summarization coming before and after certain operations, in other embodiments other orderings may take place.

Table 3 below depicts an alternative example prompt used to summarize a resolution or solution from an input set of bot transcripts; other prompts may be used:

TABLE 3

| |
|---|
| Instructions: no real names in the final summarized resolution. Replace the name with "User" or "Agent" as applicable from the context. The generated summary solution should be 300-500 words.<br>Context: I will provide you with a category name and a list of proposed solutions for that category related issue.<br>Query: I need you to extract the solution to the processed category from the list of transcripts produced. |

A sample output from the prompt of Table 3 may be the following, which summarizes solutions from multiple bot transcripts:

In addressing various IT-related issues, agents often take several key troubleshooting steps. A common method involves the agent taking remote access to the user's machine. This allows the agent to directly diagnose and address issues such as missing device drivers under sound settings, authentication failures at printers, and excessive mailbox data in Outlook. After accessing remotely, the agent may update policies, restart devices, or toggle specific settings to attempt to resolve the issue.

When issues persist, further steps taken might include advising the user to restart their machine or adjust application-specific configurations, such as instructing a user to manage device options within a software toolbar or reinstall applications. Agents also frequently guide users to use alternative tools or modes, such as switching browsers or using different authentication methods at a printer.

In more complicated cases, where immediate solutions are infeasible, agents often perform deeper system adjustments like deleting and renaming cache settings or manipulating file sizes to accommodate platform limits, particularly with Outlook. Recommendations for long-term improvements, such as setting changes for OST files in Outlook, are also common.

Additionally, when problems like continual application errors occur—e.g., with PowerPoint or VPN disconnections-agents might check and adjust network settings, refresh user profiles, or roll back recent updates that could be causing issues. For issues unresolved through direct troubleshooting, some cases are escalated for further investigation.

Finally, agents ensure to follow up on issues that require ongoing monitoring, keeping tickets open as necessary and confirming with users if implemented solutions successfully resolve the problems.

Table 4 depicts an example prompt for performing creating a standardized summary, similar to the Table 3 prompt, while at the same time calculating a metric for an accuracy of the model:

I will provide you with a category name and a list of proposed solutions for that category related issues. I need you to extract the solution to the processed category the list of transcripts produced. MAKE SURE that no real names from the proposed solutions are included in the final solution.

TABLE 4

| |
|---|
| Replace the name with "User" or "Agent" as applicable from context.<br>The generated solution should be 300-500 words.<br>Also Calculate and provide the Metric in percentage separated with pipe(|) (BLEU - Bilingual Evaluation Under study score | TER - Translation Edit Rate | METEOR - Metric for Evaluation of Translation with Explicit Ordering) used to transform the list of proposed solutions to Generated Summary<br>MAKE SURE The output should be in the following format:<br>**Generated Summary:** <summary><br>**Metric:** BLEU - <bleu_percentage> | TER - <ter_percentage> | METEOR - <meteor_percentage> |

For each standardized intent, or bucket, or for each set of tickets associated with a standardized intent, a process may extract and/or generate a set of utterances provided by a user to a chatbot associated with the transcripts associated with the standardized intent: the generation may include extracting actual utterances from the transcripts, and/or generating artificial utterances. For example, for each standardized intent, or for a group of tickets or transcripts associated with the same standardized intent or grouped with the same standardized intent, a process may, e.g. using AI such as an LLM, generate a set of utterances provided by a user to a chatbot or a human after a chatbot "fails"; the generated utterances may be associated with that set of intents. Input to a process to generate artificial utterances may be the set of prompts, or natural utterances extracted from a group of tickets sharing a standardized intent; e.g. input to generate utterances may be the input to a chatbot by a human. Intents that are identified may be enriched with natural and artificial utterances. Such a prompt may be iterative, in that it may be executed over a set of transcripts in a loop, with the prompt being the same for each new transcript in the loop (e.g. in Python script).

For example, natural utterances (e.g. those utterances that actually occur in transcripts) may be extracted, such as by the example prompt shown above in Table 1 which creates a summary, and for each project management ticket (e.g. JIRA ticket) associated with a certain intent, the set of utterances may be attached. Natural utterances may be extracted or generated from transcripts using an LLM, e.g. using an OpenAI Completions API, with engineered prompts (e.g., as in Table 1 herein). Different utterances for the same issue may be natural utterances, different ways different users raise a specific issue; these may be generated or pulled directly from a ticket transcript. For example, in Ticket 1, a user may write to a bot "I do not understand what is going on with my mailbox, it keeps hanging "; and in Ticket 2 a user may write to a bot "My outlook is freezing again and again". Both these utterances may be tied to the same matched intent.

Developers or an automatic process may use the user utterances-how users described the same problem in different ways—to develop and improve the chatbot. Knowing utterances associated with intent may aid a development team to train model associated with chatbot workflows to include this intent/scenario. Since natural utterances from tickets may not be enough to train models of a bot, embodiments may enrich the set of utterances associated with an issue with more utterances for better bot training. For example, artificial utterances may be generated, as seen in the example in Table 5 below. For example, for the intent "E-mail not working", artificially generated utterances may include "Outlook is not working"; "mails are not responding since morning"; and "Is there an outage for outlook, I am facing issues". For efficient and accurate modelling in chatbot automation for any intent, in one embodiment it is recommended to have at least 50-100 utterances associated with each intent; of course other numbers of utterances may be used.

A role-based prompting technique may be used to provide inputs to an LLM (e.g. a GenAI tool), with the role for which artificial utterances are needed. Knowing the role as part of instruction may allow more human like utterances to be produced for the same issue. A role based prompt technique may specify role (e.g. chatbot developer); task (e.g. train your ML model); and output indicator (e.g. I will provide you with prompts; you will generate XX utterances . . . ).

Utterances may be generated anew from source data such as intents or a transcript, creating simulated intents. For example, for a set of intents determined to be similar, an LLM or AI may be used to generate a set of utterances. Utterances may be extracted from existing data; for example for a set of intents determined to be similar, a set of utterances may be extracted from a set of chatbot transcripts and/or other data.

An example utterance generating prompt is shown in Table 4 below; other prompts may be used. While an example count of utterances is used, other numbers of prompts may be requested:

TABLE 5

Pretend you are a chatbot developer. You need to train your machine learning model to detect the intent based on the prompt and the user's message, for which you need to generate human-prompt like utterances (70 in count) from all the similar prompts users have given in the past for a sub-category of questions before. I will provide you with the list of humans entered prompts. You need to then generate 70 utterances for the same sub-category of questions to train your model.
Return ONLY the 70 generated responses separated by | and size of 100.
Human prompts list: [PROMPT WILL ADD HUMAN PROMPT DATA HERE]

An example output of utterances from such a prompt is shown in Table 6 below:

TABLE 6

I am unable to access FIS Global for debit card transactions, and I do not have my username or password
Want to know if my cell phone is compliant for BYOD
I am unable to access Vista even though my entitlement request has been approved via SystemX.
I have been added to the deal team but I can't access the deal folder which I need to do ASAP. What should I do?
How do I request access for my.euroclear.com
I am unable to open DAI, how can I fix it?
Got Approval for SystemY - unable to get the application on SystemZ after full entitlement approval
I'm trying to access the GSystem of my team, can you help?
I use Host Explorer everyday for 2.5 years, I can't connect to the server, can you escalate on your end in this case
I'm having an issue with the website BookXXX; it says that my account is not compatible with BookXXX but I need to book MM for one of my events.
Installation of OpenSource GitExtensions fails, what do I do?
I am not able to launch Eclipse; it seems like a Java license approval issue. Can you check if it is approved or help with the approval process?
When trying to run the application in Visual Studio, I am getting an error described as "NETSystem Assets file not found." How can I fix this?
How can I request access to a specific folder?
I still have issues opening any files on this website; how can this be fixed?

TABLE 6-continued

What should I do when I get an error while submitting my training assessment summary in Applications?
How can I request access to specific folders if I am receiving errors while attempting to add them on the platform?

For each standardized intent or bucket a process may create a project management ticket including a standardized intent and a set of associated resolutions and a set of associated utterances; and/or automatically train, retrain, or improve a chatbot using, among other data, utterances. For example, a process may use the data created, typically associated with or linked to the original bot ticket or transcript, and create a project management (e.g. Jira) ticket including a standardized intent and a set of associated resolutions or solutions and a set of associated utterances; such data may also be used to automatically update, retrain, or modify the bot itself. A project management ticket and/or bot retraining may be performed or created for each set of intents determined to be similar: for example, a set of bot tickets, each corresponding to a standard intent or set of intents determined to be similar, may be grouped and used to form one Jira ticket or bot retraining action. Resolutions may be summarized, e.g. using a prompt input to an AI or LLM, such that a Jira ticket may include a set of summarized resolutions associated with a set of utterances and other data. For example, based on or using data such as intent, summary, and utterances, a process may generate a Jira ticket and insert the ticket in a Jira system, to which a user will respond and use to update, refine or develop a bot. The creation of a project management ticket may be algorithmic, performed for example by a Python process. A set of transcripts or bot tickets which were resolved by agents (but where the interaction started with a bot) may be clustered or grouped (e.g. using an AI) so those with the same standardized intent are grouped together, and the resolution, typically a human agent created resolution, standard intent and utterances may be placed in the Jira ticket. A developer may later use the Jira ticket to update or retrain the bot; or an automatic process may input the Jira ticket to update or retrain the bot. A resolution, or solution, output by a bot may include a link or URL to a process that may automatically fix the problem or issue.

A Jira ticket may include data from multiple bot tickets or transcripts having the same standardized issue, and thus the Jira ticket may include different summaries. The Jira ticket may include multiple solutions, each summarized, since different solutions may work for different users for a similar issue. A process creating Jira tickets may input a set of bot tickets (e.g. representing sessions between bots and humans, with associated transcripts) which may be represented or identified by ticket number, creation date, a short description or title, and other information or metadata.

Figure 3:
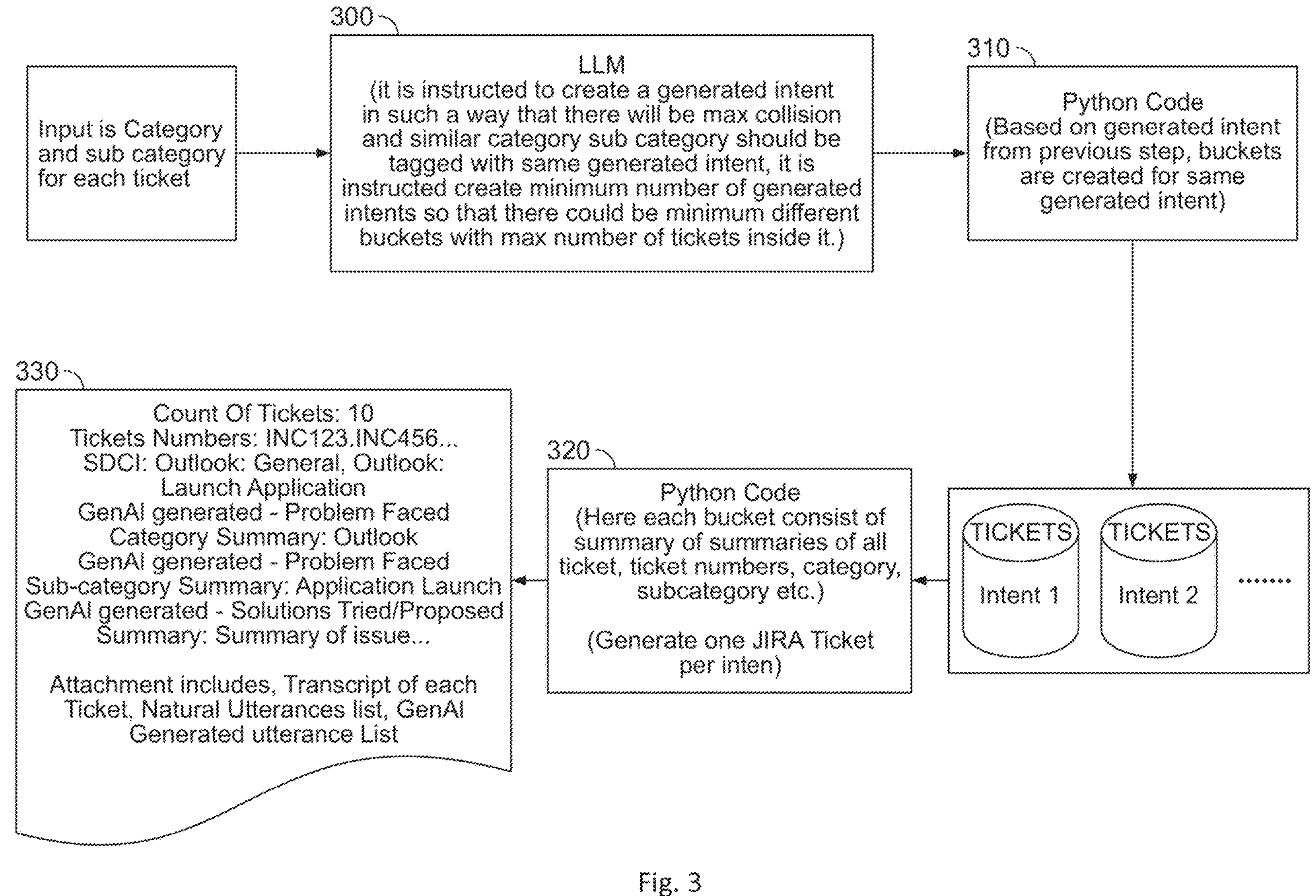
FIG. 3 depicts an example process to create a project management ticket or issue according to some embodiments.

An example process to create a project management ticket or issue according to some embodiments is shown in FIG. 3. Referring to FIG. 3, in operation 300, a process may input data such as category and subcategory for a relevant set of tickets and create or bucket intents, and a process may create a minimum number of intents or buckets each with the maximum number of intents inside the bucket. Tickets with similar category and subcategory may be bucketed with the same standardized intent. Operation 300 may use the example prompt shown in Table 2. In operation 310, code, such as Python code, may validate the output, checking that all tickets are associated with a standardized intent or bucket, and merging the intents based on category and subcategory. In operation 320, code, such as Python code, may provide input to an LLM or generative AI to generate a summary of summaries for each bucket of standard intent: for each bucket or standardized intent, the summaries for all tickets may be input and standardized to create one summary for that ticket. Output such as shown in 330 may be produced, which may correspond to the contents of a project management ticket, and which may include for each bucket, for example, the number of tickets in the bucket, the identifiers of all tickets in the bucket, SDCI (e.g. incident) information, and other information.

An example set of code to create a project management ticket is shown in Table 7 below; other code may be used, and the Jira system need not be used:

TABLE 7

```
 def_process_jira_format (title, description, tickets, sdci, status):
 desc={
  "*Count Of Tickets*": len(tickets), // number of bot tickets relevant to
the project management ticket
 "*Tickets Numbers*": ", ".join("["+i+"|"+"https://msuat.service-
now.com/show_ticket.do?"+i+"]"+" *("+j+")*" for i,j in zip(tickets,status)),
// each ticket number is a specific bot ticket
  "*SDCIs*": ", ".join(i for i in list(set(sdci))),
  "*GenAI generated - Problem Faced Category Summary*": category,
  "*GenAI generated - Problem Faced Sub-category Summary*":
  subcategory,
  "*GenAI generated - Solutions Tried/Proposed Summary*":description
 }
Return "\n".join(f" {key}: {value} "for key, value in desc.items ( ))
```

In Table 7, Count Of Tickets may be the number of bot tickets relevant to the project management ticket (e.g., similar tickets); Tickets Numbers may be a list of specific bot tickets; SDCI's (Service Desk Defined Configuration Item) may be a component in managing incidents and service requests within the ServiceNow platform, for example the Zoom platform, Outlook platform, etc.; GenAI generated-Problem Faced Category Summary—Category may be a platform or component, e.g. the Outlook platform; GenAI generated—Problem Faced Sub-category Summary-Subcategory may be a description of problem in a few words (e.g. Keeps crashing, Slowness etc.); GenAI generated—Solutions Tried/Proposed Summary: description may be a summary of solutions mentioned in the above tickets as well as solution proposed by GenAI.

Based on the output of Table 7, a project management ticket may be created, using for example example code as in Table 8:

TABLE 8

```
GRN = "grn:/ms/company/CSHRIT4IT/CorporateServices/
CWTInnovation"
 --- This is for JIRA API integration
c = get_jira_client("http://jirademo.ms.com/", grn=GRN)
----This is the method for creating jira
def create_issue(title, description):
   output = c.create_issue(project_key = "GENAI", summary =
title,issuetype_name = "Bug", descript
```

Figure 4:
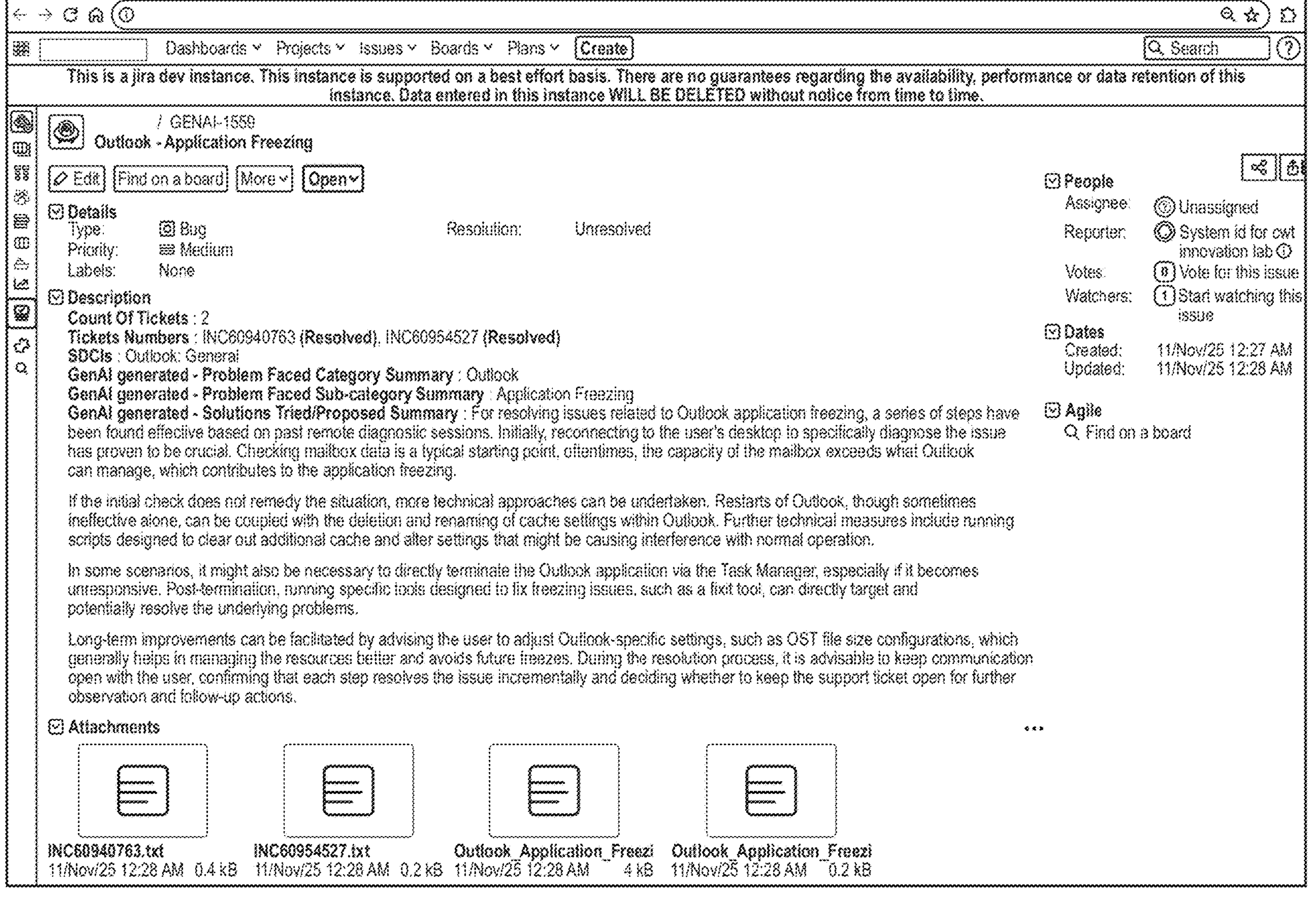
FIG. 4 depicts an example project management (e.g. Jira) ticket produced by an embodiment of the present invention.

FIG. 4 depicts an example display to a user of a project management (e.g. Jira) ticket produced by an embodiment of the present invention.

Alternately, or in addition, based on the Jira ticket, the bot may be automatically updated, refined or developed, for example using the findings or data which is, or otherwise would be, placed in a project management (e.g. Jira) ticket. A process may use the data created, typically associated with or linked to the original bot ticket or transcript, and automatically update, retrain, or modify the bot itself. For example, a chatbot may be trained using utterances created at an earlier stage in a process. A bot may be trained to connect or map user queries, e.g. including intents and or utterances, to a correct bot workflow, e.g. containing a solution to a user issue. Utterances produced by processes described herein may be added to a txt or other file, and these utterances may be appended to existing utterances of a bot automatically.

Bot update or training, whether by an automated process or performed by a human, may add utterances to the bot knowledge base, and/or better link utterances to solutions output by a bot. A common problem leading to bot failure (and thus a transcript switching from bot-user to human-user) is that the bot may have the solution, but cannot identify the solution from the user's utterances. A fix as a result of a Jira ticket or automatic process may better link utterances to a solution, or enrich utterances known to the bot. A separate bot enhancement may be a new skill—e.g. a new solution provided by the bot.

Various analyses may be consolidated for example using Python libraries or scripts. Input to a process producing Jira tickets may include, data produced or extracted by earlier processes, for example: collecting data for ticket numbers dealing with the same or similar issues, data including AI generated intent, AI generated summarized resolutions, and AI generated utterances. These sets of data may be integrated, for example, by a Python script, and then used to create a new JIRA ticket. (for example, using a Jira project key or another identifier). Typically, multiple tickets or bot interactions are combined or grouped (e.g. based on common intent or other common data) into one JIRA ticket. Findings may be output, and automated processes may take place, based on or in parallel to this output.

The process may be governed by an overall control process, such as a Python script, using a React process for a user interface (UI), NumPy libraries for data manipulation, pandas data analysis libraries, the Flask web development framework for user interface tasks, and the OpenAI Completions API. In one embodiment the control process may be executed regularly or periodically, e.g. via a batch operation scheduled at a certain frequency or periodicity, for example using the AutoSys platform at a set schedule so that, for example, daily support tickets are processed, or possibly pre-analyzed and summaries generated, in preparation for action taken by a core utility. A UI may display information such as all related incident tickets along with automatically generated Jira tasks. A Git, Jira process may integrate an embodiment with the Git system to manage code and version control. Embodiments may use a Jenkins open source automation server for a CI/CD pipeline and release deployment. Other technology components may be used.

In one embodiment, the same LLM or AI tool is used for more than one process—e.g. the same LLM may be used for creating an intent, creating a resolution, creating utterances, etc. In other embodiments, more than one LLM may be used such that a different LLM is used for different sub-processes.

Figure 5:
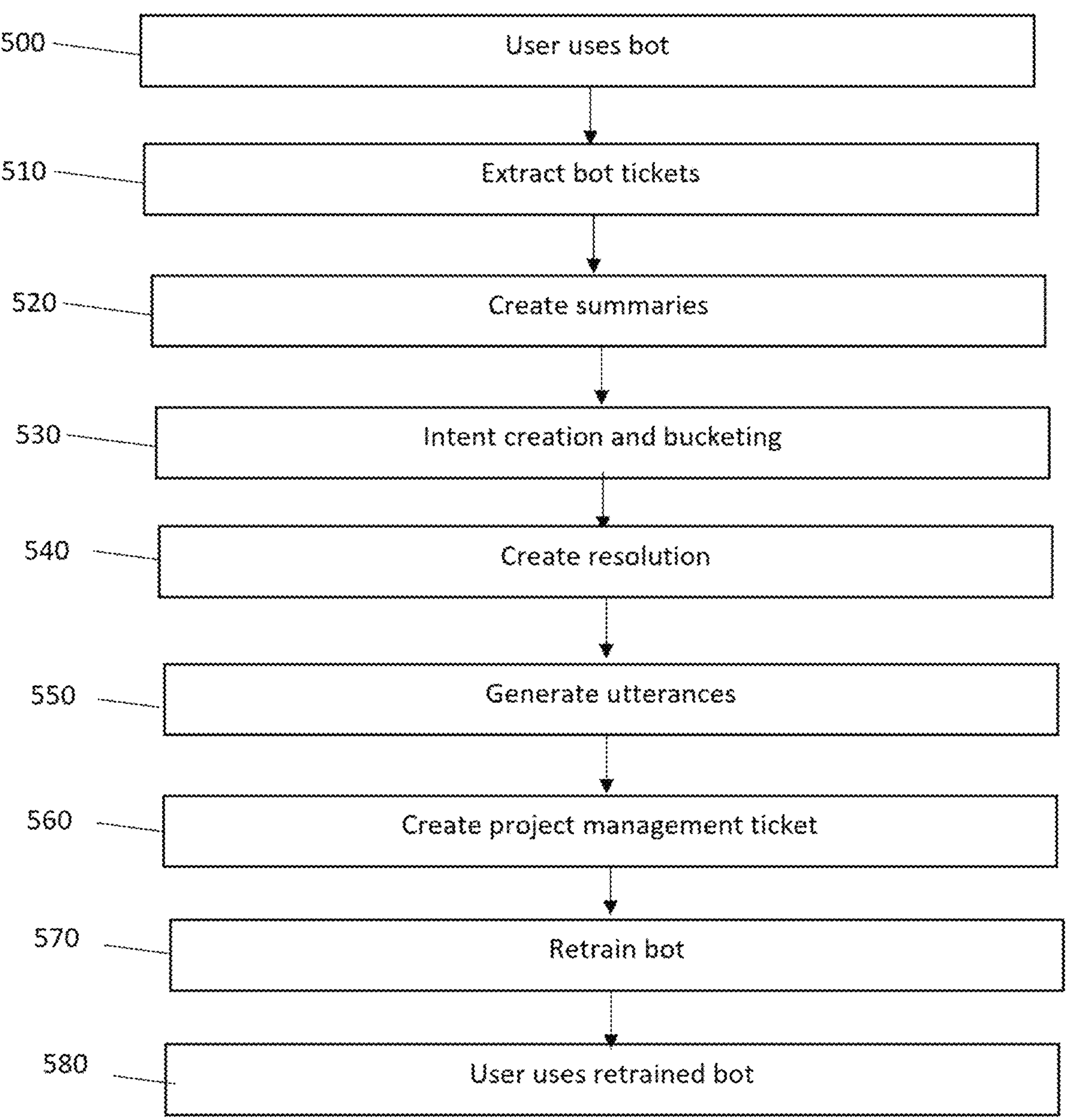
FIG. 5 shows a flowchart of a method for bot improvement according to embodiments of the present invention.

FIG. 5 shows a flowchart of a method for bot improvement according to embodiments of the present invention. The operations of FIG. 5 (and of other flowcharts shown herein) may be performed by computer systems and modules shown in FIG. 1, but other computer systems, and other modules, may be used. As with other flowcharts herein, while an exemplary method is depicted for illustrative purposes in the flowchart of FIG. 5, it will be appreciated by those skilled in the art that features and operations from this procedure may be selectively combined with features and operations from alternative embodiments of the invention without departing from the remit of the disclosure. Further, while certain features and operations are expressly included in the flowcharts shown herein, it will be appreciated by those skilled in the art that not all depicted features and operations are mandatory elements, and that different embodiments may omit certain features or operations without departing from the remit of the disclosure. Accordingly, embodiments including combinations of the features and operations recited in the flowcharts shown herein are expressly within the remit of the disclosure and do not constitute an intermediate generalization of the same.

While the operations presented below are in a certain order, in other embodiments, other orderings may take place, or some operations may be performed in parallel.

In operation 500, a user, e.g. a person using a device such as user device 180, may communicate with a bot, e.g. a chatbot 152 executed by server 150; the overall session may be called an interaction or ticket. The user and chatbot may exchange typically written messages, for example regarding a software, equipment, or IT problem, or another issue such as a customer service problem or another subject not involving a "problem". In some instances, if it becomes apparent that the bot is not successfully addressing the user's concerns, a live agent may take the place of the bot. The text of the exchange including user and bot and/or live agent produced text may be combined into a transcript. A record of the exchange may be saved, with metadata, such as a ticket number which may uniquely identify the interaction or ticket. The data may be saved to a database. Multiple such interactions may occur and be saved.

In operation 510, a developer, for example accessing bot development system 116 may initiate a process to cause bot development system 116 to extract, select or create a set of bot interactions or tickets to analyze, for example by inputting a date range. Bot development system 116 may filter out or remove bot interactions where the interaction did not switch to a human to provide the solution and/or interactions where there was no successful resolution or solution; other filtering may be performed. While bot development system 116 is described as performing certain functionality, in other embodiments such functionality need not be performed by bot development system 116 or by one process.

In operation 520, bot development system 116 may, for each of a group of chatbot transcripts or tickets (e.g. those created in operation 510), create or extract a summary using an AI such as an LLM; a number of summaries, each associated with a bot ticket, may be created.

In operation 530, bot development system 116 may, for each of the selected group of chatbot transcripts or tickets, create standardized intent and/or bucket the transcript or ticket according to the intent. For example, a process may, based on the created set of summaries, create a set of standardized intents, each standardized intent associated with a set of chatbot transcripts determined to be similar. The assigned intent may be associated with original data such as a category/subcategory, such that tickets having a category/subcategory assigned to the same intent are themselves deemed similar. The assigned standardized intent may be associated with a set of transcripts or tickets; the assigned intent may be associated with any original intent, or may replace the original intent, or category/subcategory.

In operation 540, for each bucket of bot transcripts or tickets, or each set of tickets with a similar solution, a process may create, for example using an AI or LLM, a resolution summarizing the solutions for those tickets. For example, one description of the manner the problem expressed in the tickets, or the intents (e.g. the intent associated with the transcript or ticket), was solved may be created for a bucket of tickets. The same AI or LLM may be used for all operations, or different AIs or LLMs may be used.

In operation 550, for each set of intents determined to be similar, a process may generate a set of utterances provided by a user to a chatbot associated with the set of intents. For example, bot development system 116 may, for each of the group of chatbot transcripts or tickets, extract from bot transcripts utterances and/or generate new utterances not necessarily found in the transcripts.

In operation 560, a process may create a project management ticket including a standardized intent and a set of associated resolutions and a set of associated utterances. For example, bot development system 116 may, for a group of chatbot transcripts or tickets, create a project management (e.g. Jira) ticket. In response to or using the project management ticket, a developer may (possibly using data created in operations 520-550) revise, retrain, or update the bot.

In operation 570, bot development system 116 may, for a group of chatbot transcripts or tickets, use the data created (e.g. in operations 520-550 such as utterances, and/or other data) to automatically revise, train, retrain, or update the bot.

In operation 580, the bot may operate in an improved manner, e.g. a user, e.g. using user device 180, may communicate with an improved version of chatbot 152 and use the retrained or updated bot.

Other operations and series of operations may be used.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for improving a chatbot, the method comprising, using a processor:

for each of a plurality of chatbot transcripts, the processor creating a summary using an LLM (large language model) to create a set of summaries;

based on the set of summaries, the processor creating, using an LLM, a set of standardized intents, each standardized intent associated with a set of chatbot transcripts determined to be similar;

for each standardized intent, the processor generating, using an LLM, a set of utterances provided by a user to a chatbot associated with the transcripts associated with the standardized intent and a set of artificial utterances;

for a subset of the plurality of chatbot transcripts, the processor creating, using an LLM, a resolution summarizing the manner the intent was solved for the subset of the plurality of transcripts; and the processor performing for each standardized intent training a chatbot using the user provided utterances and artificial utterances associated with the standardized intent, the standardized intent, and a set of resolutions associated with the standardized intent, and a set of transcripts clustered by intent, such that the user provided utterances are enriched with the artificial utterances for improved training where the bot is trained to detect intent and connect utterances to a solution to be output by the bot, and each standardized intent is used for a chatbot retraining action and the chatbot is trained to map intents and utterances, to a resolution; wherein training the chatbot comprises training generative artificial intelligence (AI) used by the chatbot.

2. The method of claim 1, comprising, for a set of intents associated with a standardized intent, extracting from a set of chatbot transcripts a set of utterances.

3. The method of claim 1, where the LLM used for creating a set of standardized intents, and the LLM used for creating a resolution are the same LLM.

4. The method of claim 1, comprising creating the plurality of chatbot transcripts by users interfacing with a chatbot.

5. The method of claim 1, wherein each summary is a structured summary with defined fields.

6. A system for improving a chatbot, the system comprising:

a memory; and a processor to:

for each of a plurality of chatbot transcripts, create a summary using an LLM (large language model) to create a set of summaries;

based on the set of summaries, create a set of standardized intents using an LLM, each standardized intent associated with a set of chatbot transcripts determined to be similar;

for each standardized intent, generate, using an LLM, a set of utterances provided by a user to a chatbot associated with the transcripts associated with the standardized intent and a set of artificial utterances;

for a subset of the plurality of chatbot transcripts, create, using an LLM, a resolution summarizing the manner the intent was solved for the subset of the plurality of transcripts; and perform for each standardized intent training a chatbot using the user provided utterances and artificial utterances associated with the standardized intent, the standardized intent, and a set of resolutions associated with the standardized intent, and a set of transcripts clustered by intent, such that the user provided utterances are enriched with the artificial utterances for improved training where the bot is trained to detect intent and connect utterances to a solution to be output by the bot, and each standardized intent is used for a chatbot retraining action and the chatbot is trained to map intents and utterances, to a resolution; wherein training the chatbot comprises training generative artificial intelligence (AI) used by the chatbot.

7. The system of claim 6, wherein the processor is to, for a set of intents associated with a standardized intent, extract from a set of chatbot transcripts a set of utterances.

8. The system of claim 6, where the LLM used for creating a set of standardized intents, and the LLM used for creating a resolution are the same LLM.

9. The system of claim 6, wherein the processor is to create the plurality of chatbot transcripts by users interfacing with a chatbot.

10. The system of claim 6, wherein each summary is a structured summary with defined fields.

11. A method for improving a bot, the method comprising, using a processor:

the processor summarizing, using an LLM (large language model), each of a plurality of bot transcripts using a generative AI tool to create a plurality of summaries;

based on the plurality of summaries, the processor creating, using an LLM, a set of intents, each intent associated with a plurality of bot transcripts determined to be similar;

for each intent, the processor generating using an LLM utterances provided by a user to a bot associated with the transcripts associated with the intent and a set of artificial utterances;

for a subset of the bot transcripts, the processor creating, using an LLM, a resolution summarizing how the intent was solved for the subset of the plurality of transcripts; and for each intent the processor performing improving a bot using the user provided utterances and artificial utterances associated with the intent, the intent, and a set of resolutions associated with the intent, and a set of transcripts clustered by intent, such that that the user provided utterances are enriched with the artificial utterances for improved training where the bot is trained to detect intent and connect utterances to a solution to be output by the bot, and each intent is used for a bot improving action and the bot is trained to map intents and utterances to a resolution; wherein improving the bot comprises training generative artificial intelligence (AI) used by the bot.

12. The method of claim 11, comprising, for a set of intents associated with a standardized intent, extracting from a set of bot transcripts a set of utterances.

13. The method of claim 11, where the LLM used for creating a set of intents, and the LLM used for creating a resolution are the same LLM.

14. The method of claim 11, comprising creating the plurality of bot transcripts by users interfacing with a bot.

* * * * *